March 8, 1966 R. W. TACCONE 3,238,575
SAND MOLDING AND AERATING MACHINE
Filed Oct. 23, 1963 7 Sheets-Sheet 1

INVENTOR.
RUSSELL W. TACCONE
BY
Charles L. Lowenbach
atty

March 8, 1966  R. W. TACCONE  3,238,575

SAND MOLDING AND AERATING MACHINE

Filed Oct. 23, 1963  7 Sheets-Sheet 2

INVENTOR.
RUSSELL W. TACCONE
BY
Charles L. Lorencheck
atty

March 8, 1966 R. W. TACCONE 3,238,575
SAND MOLDING AND AERATING MACHINE
Filed Oct. 23, 1963 7 Sheets-Sheet 3

INVENTOR.
RUSSELL W. TACCONE
BY
Charles L. Lovercheck
att,

March 8, 1966  R. W. TACCONE  3,238,575
SAND MOLDING AND AERATING MACHINE
Filed Oct. 23, 1963  7 Sheets-Sheet 5

INVENTOR.
RUSSELL W. TACCONE
BY
Charles L. Lovercheck
atty

March 8, 1966  R. W. TACCONE  3,238,575
SAND MOLDING AND AERATING MACHINE
Filed Oct. 23, 1963  7 Sheets-Sheet 6
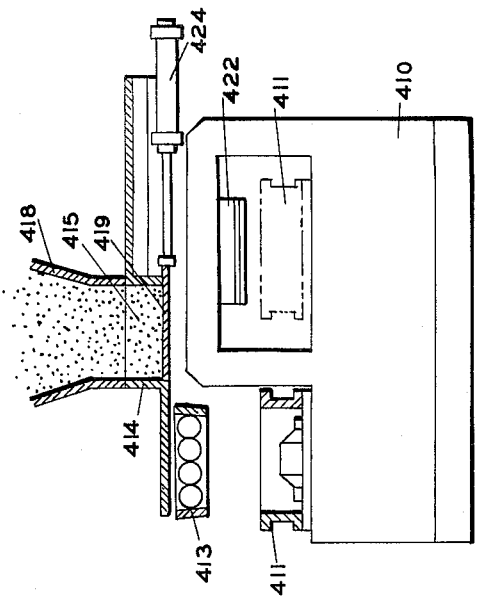
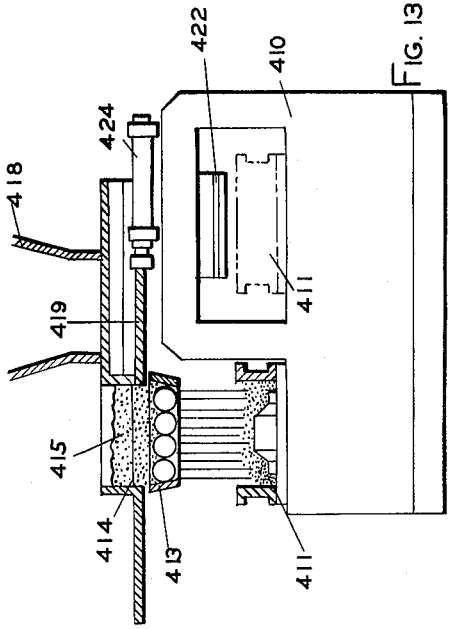
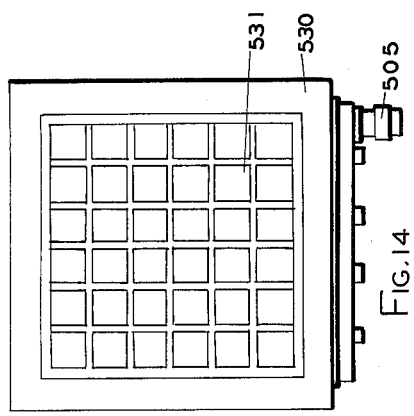
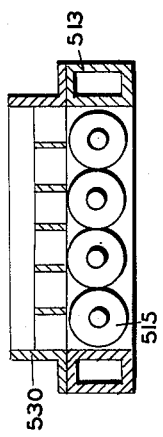
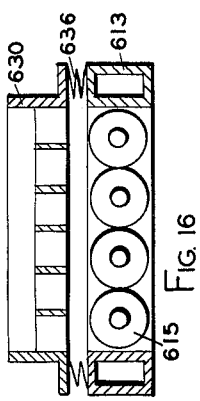
*INVENTOR.*
RUSSELL W. TACCONE
BY
Charles L. Lorenchel
atty March 8, 1966 R. W. TACCONE 3,238,575
SAND MOLDING AND AERATING MACHINE
Filed Oct. 23, 1963 7 Sheets-Sheet 7
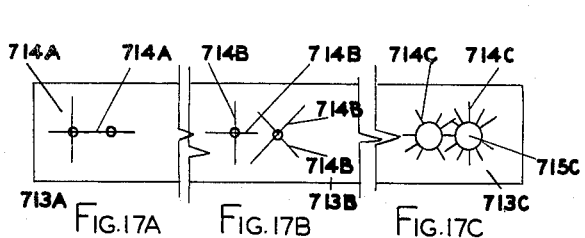
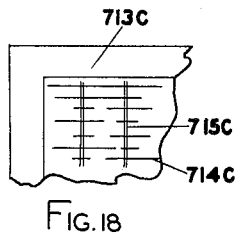
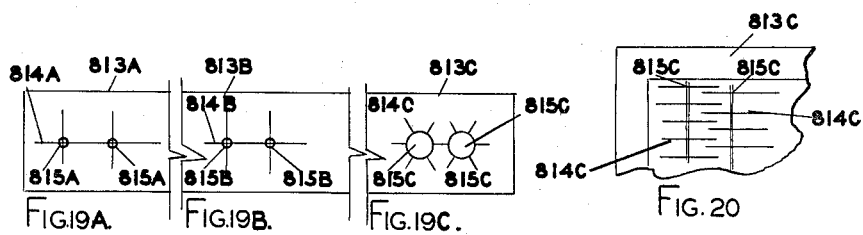
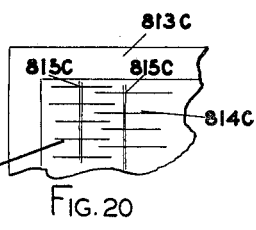
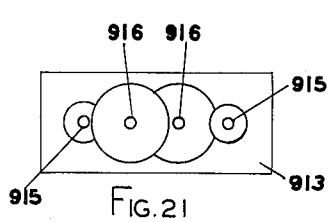
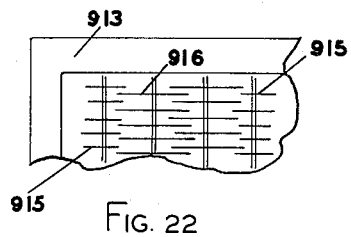
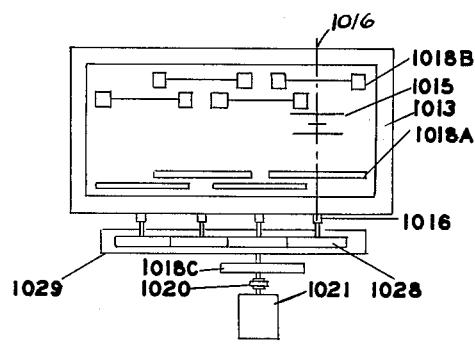
FIG. 23
INVENTOR
RUSSELL W. TACCONE
BY
Charles L. Lorenbuch
atty United States Patent Office 3,238,575
Patented Mar. 8, 1966

3,238,575
SAND MOLDING AND AERATING MACHINE
Russell W. Taccone, Erie, Pa., assignor to Taccone Corporation, Erie, Pa., a corporation of Pennsylvania
Filed Oct. 23, 1963, Ser. No. 318,383
8 Claims. (Cl. 22—35)

This application is a continuation-in-part of patent application, Serial No. 849,065, filed October 27, 1959, now abandoned.

This invention relates to molding machines and, more particularly, to molding machines in combination with sand conditioning devices.

The sand conditioning device disclosed herein is made up of rotor blades which are supported in the path of sand falling from a sand loading device. The sand passes between the rotating blades into the flask. The rotating blades pick up the sand and impart to it a velocity and a direction.

To accomplish the proper loading of the flask, several factors are involved. These factors are the size, shape, location, space, and direction of rotation of the blades and the quantity of sand that is put through the blades in a given period of time.

In order to increase the velocity of the falling sand, it is necessary for the peripheral part of the blade to engage the sand. In order for the sand to engage the periphery only, it is necessary to block the sand from entering the inner portion of the blade. This can be done by a solid rotor disposed inwardly of the blade or a thin portion on the blade at the edge of the axis of rotation. At the same time, the outer ends of the blades will be larger to afford a paddle effect. By controlling the size and speed of the paddles, the velocity at which the sand leaves the blades can be controlled. Deflector blades are provided to control the direction of flow of the sand.

Another means for controlling the speeding sand is to control the position at which it engages the rotating plates. By directing the sand downwardly to the blades for action thereof, the power requirements to operate the blades will be minimized and, at the same time, additional impetus will be given to the sand. The spacing of the blades is also a factor since this governs the length of the blades. It also has a direct relation to the speed required.

With the proper arrangement of size of blade, length of blade, and baffling, the sand may be fluffed, agitated, and conditioned as well as aerated. To fluff the sand, a blade is necessary which will agitate and break up the lumps and leave it in aerated condition and give it a low velocity; however, to get a higher specific gravity of sand, higher velocity and a different shape and size of blade are desirable.

Because of being able to control the uniformity of the distribution of the sand in the mold and, also, the specific gravity, and because of the riddling effect at the surface of the mold which is almost equivalent to a facing sand in some instances, it is now possible to extend the use or application of the molding machine. It is now possible to make patterns or castings which have not been able to be made on the machine prior to this time.

By the proper use of the machine disclosed herein, it is possible to use a diaphragm molding machine on applications which now require the use of a much higher pressure machine. This results in definite cost savings in the overall application of the molding machine.

By controlling the loading of the sand in the flask and controlling its specific density, it is possible to finally squeeze the mold with less pressure and for a lesser time internal. Because of the better preparation of the sand in the flask prior to molding, it is not necessary to squeeze so long or so hard. This was previously time consuming and a power factor.

Machines for automatically filling flasks frequently riddle or prepare the sand at a station remote from the loading station at the molding machine itself.

After the sand is carried through various conveyors, elevators, and other sand handling units, it is discharged into a chute above the molding machine and held by a sand valve prior to being discharged into the flask. During this handling, the sand is prone to become packed or caked. Further, sand discharged from the chute will not be evenly distributed when dispensed into the flask.

A better way to put sand into the flask would be to hand riddle it or prepare it in some similar manner; however, obviously, this method is too expensive and too time consuming for use on a modern production scale and it is, therefore, impractical. If the sand is not properly prepared and properly discharged into the flask, it will not pack uniformly around the pattern.

It has been discovered that by providing a plurality of rotating rotors in a chute from which the sand is discharged, the rotors having spaced interlacing teeth thereon, the sand will be fluffed, aerated, or propelled in the optimum manner, decided and governed by the various methods of approach used as described herein. This has several advantages:

(1) The sand will be separated or broken up by these rotating blades and, therefore, be delivered into the flask in a better condition for use in molding.

(2) The rotating blades drive the sand into the flask rapidly and reduce the time for loading the flask.

(3) The rotating blades pick up the sand and impart a velocity to it which can be controlled by the shape, size, location, speed and direction of rotation of the blades. This added velocity allows an increase in specific gravity of the sand in the flask prior to molding.

(4) The rotating blades permit more uniform or a controlled fill of the flask prior to molding, depending upon the shape, size, and location of the blades as well as the speed and direction of rotation.

It has also been discovered that by providing a proper mechanism as described herein, the sand is fluffed and aerated at the same time. Further, the fluffed and aerated sand will be automatically riddled into the flask and onto the pattern.

It has been further discovered that the addition of air to the sand by fluffing or aerating the sand in the flask in the manner disclosed will entrap air in the sand. During the initial stages of squeezing before the air has been permitted to escape from the sand, the air is compressed and forms a media in which the sand particles may flow more readily than if no air were entrapped. An analogy of this would be the effect of entrapped water in quick sand which permits the flow of sand therein.

Further, it has been discovered that by using the fluffing, riddling, and directing mechanism in combination with a control over the speed and direction of rotation of the blades, it is possible to control the degree to which any one or group of the above mentioned results may be obtained. It has also been discovered that by controlling the shape, size, and location of the blades relative to one another, it is possible to control the direction and velocity of the sand. Further, this control combined with the independent control with the speed and direction of rotation of the blades give a broad range and control of direction and velocity of sand. The size of the flask and type of castings to be made help to dictate the number of rotating members.

The above described control of the direction and velocity of the sand permits a control of the sand distribution within the flask. The uniformity or varying amount of distribution is dependent upon the above conditions. The specific gravity of the mold prior to molding is controllable by the above controls which will allow a uniform specific gravity or a predetermined variation. A compensation for the shape, size, or type of pattern used in the molding may be accounted for by use of the above mentioned controls.

Further, by controlling the specific gravity or amount of the sand used in filling the flask, it is possible to reduce the height of the flask or the need for an upset. Also, the controlled filling of the flask will eliminate voids or lack of sand in any particular areas within the flask and will thus facilitate the squeezing or compacting of better molds and will allow a wider application for the molding machine as far as more intricate or difficult patterns are concerned.

It is, accordingly, an object of the present invention to provide an improved loading device for preparing the sand and dispersing it prior to delivering it to a flask to be molded.

Another object of the invention is to provide an improved sand discharging device.

Still another object of the invention is to provide an improved fluffing and aerating machine.

A further object of the invention is to provide an improved aerating, riddling, and fluffing machine in combination with a squeezing or compacting machine.

Yet a further object of the invention is to provide a sand conditioning device which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
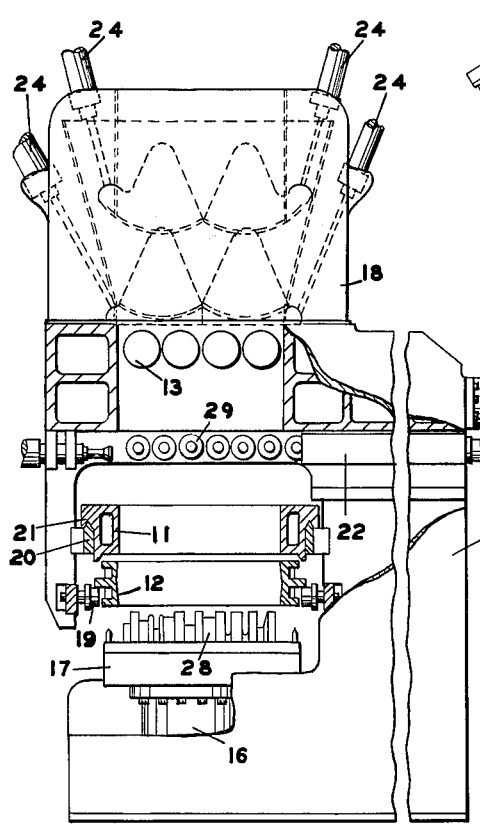
FIG. 1 is a schematic side view of a loading machine in cross section for a clearer understanding of the invention with the machine ready to load sand.
Figure 2:
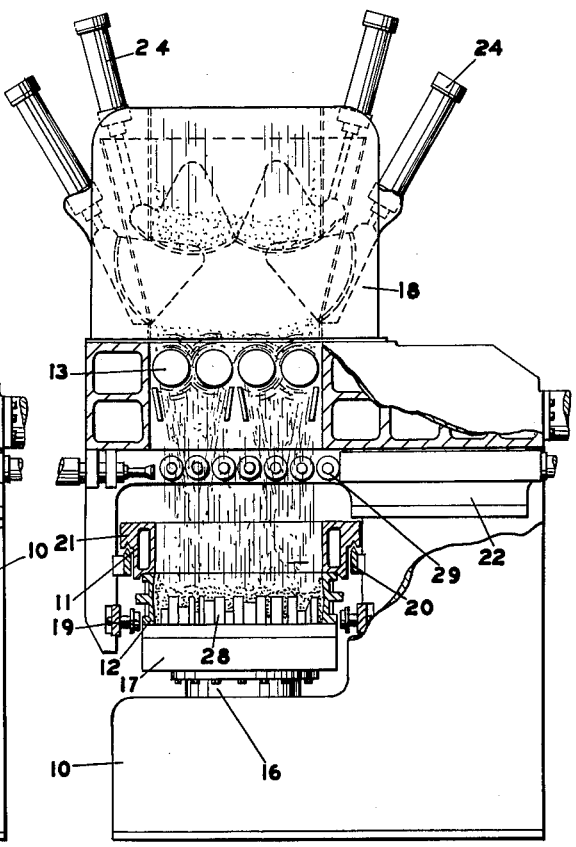
FIG. 2 is a view of the machine shown in FIG. 1 with the device in operation showing the directional control vanes.
Figure 3:
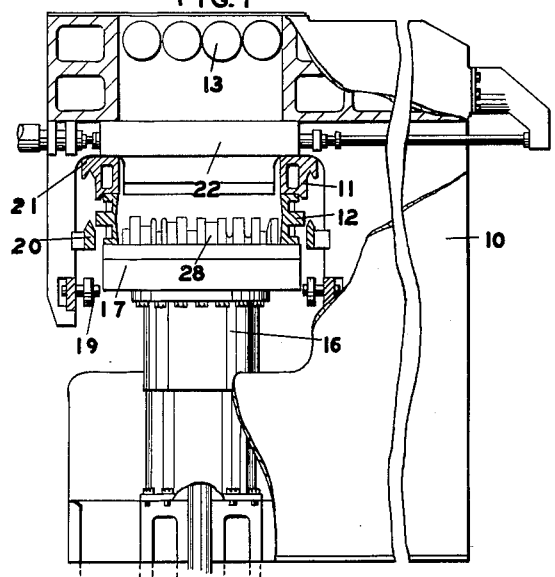
FIG. 3 is a view of the machine shown in FIG. 1 after loading, with the molding head in place thereon.
Figure 4A:
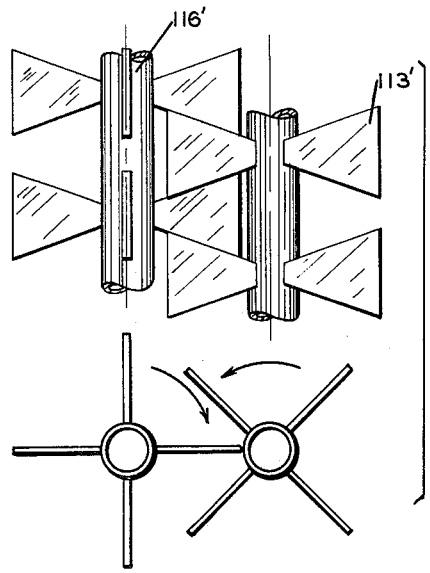
FIG. 4 is a top view of the machine.
Figure 4B:
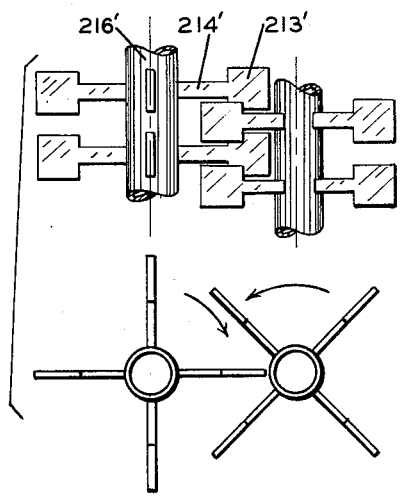
Figure 4C:
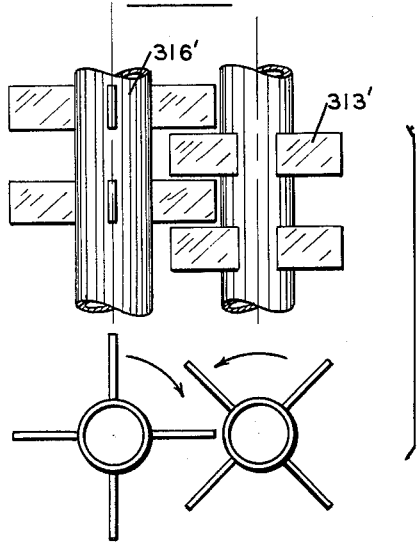
Figure 4:
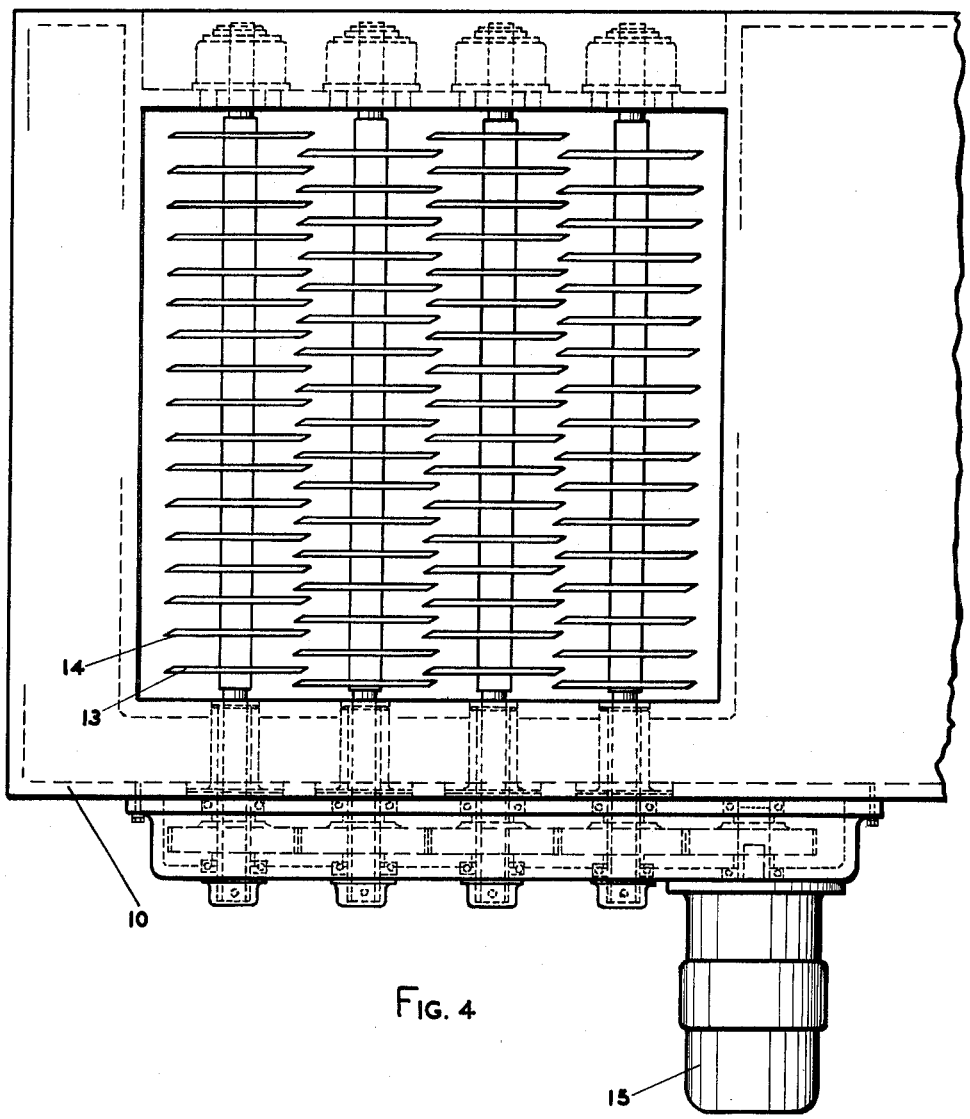
Figure 5:
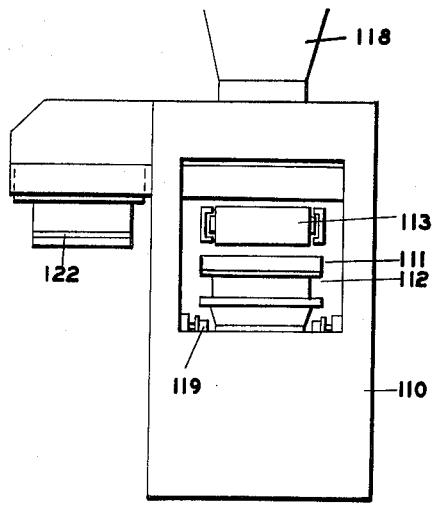
Figure 6:
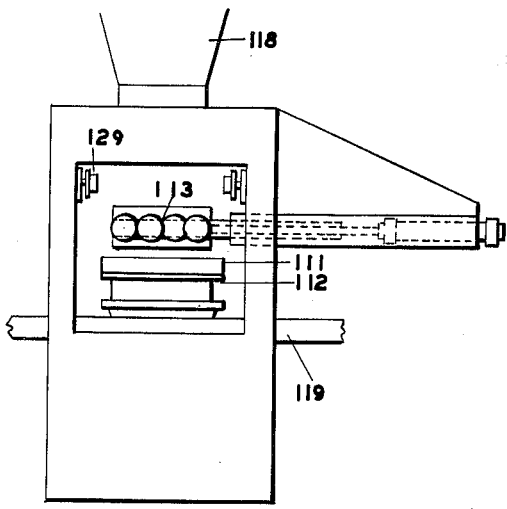
Figure 7:
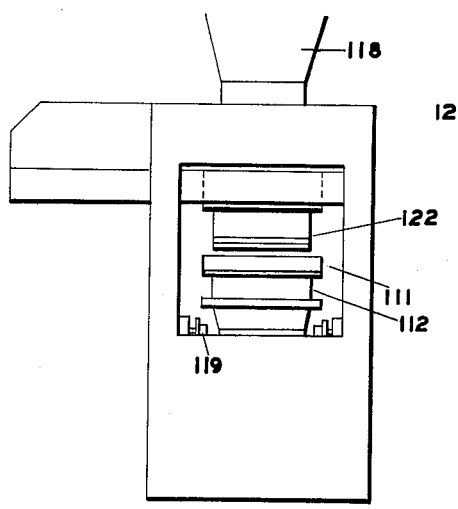
Figure 8:
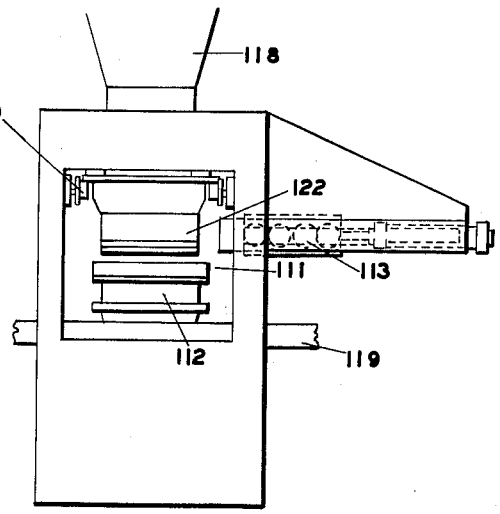
Figure 9:
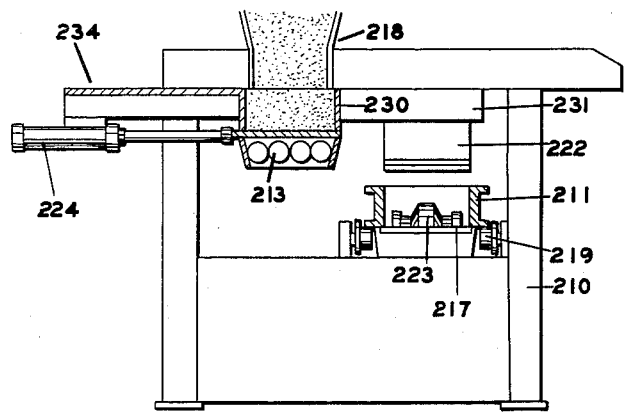
Figure 10:
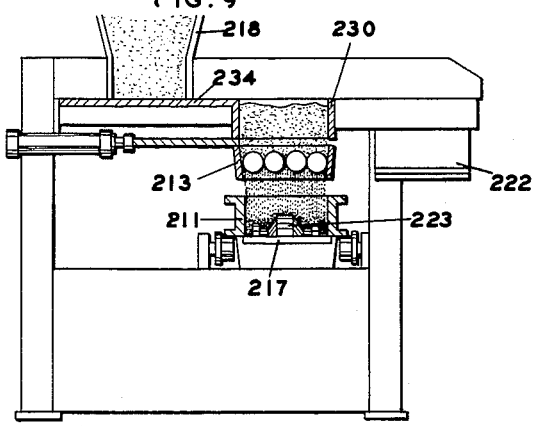
Figure 11:
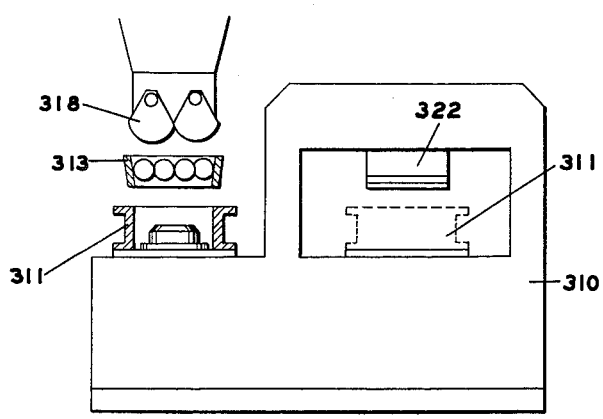

FIGS. 4A, 4B, and 4C show different embodiments of blade shapes to be used in the embodiment shown in FIG. 4;

FIG. 5 is a side view of another embodiment of the invention with an independently operating sand conditioner in working position;

FIG. 6 is a front view of the machine shown in FIG. 5 with the sand conditioner extended over the flask;

FIG. 7 is a side view of the machine shown in FIG. 5 showing the unit in stand-by position;

FIG. 8 is a front view of the machine shown in FIG. 7 with the sand conditioner retracted and the molding head in position;

FIG. 9 is a side view of an embodiment of a molding machine showing a sand conditioning device attached to a sand loader in retracted position;

FIG. 10 is a view of the machine shown in FIG. 9 with the sand conditioning device in operating position;

FIG. 11 is a side view of a molding machine showing a permanently mounted, independent operating said conditioner;

FIG. 12 is a side view of an independently operated sand conditioner with a drawer type sand loader with attached safety guard showing a safety guard in position;

FIG. 13 is a view of the machine shown in FIG. 12 with the sand loader in "dump sand" position and the safety guard moved out of the way;

FIG. 14 is a top view of a sand conditioner with the safety guard in position;

FIG. 15 is a sectional view through the machine shown in FIG. 14;

FIG. 16 is a sectional view through a machine similar to the machine disclosed in FIG. 14 showing an independently mounted vibrating unit;

FIGS. 17A, 17B, and 17C are diagrammatic views of sand conditioning device showing teeth arrangements with meshing teeth in line or parallel rotors;

FIG. 18 is a plan view of the device shown in FIG. 17C;

FIGS. 19A, 19B, and 19C are sectional views showing teeth arrangements with meshing teeth staggered on parallel rotors;

FIG. 20 is a plan view of the device shown in FIG. 19C;

FIG. 21 is a schematic side view showing different size teeth and different center distances between rotors;

FIG. 22 is a plan view of the device shown in FIG. 21; and

FIG. 23 is a plan view showing the application of flywheels in several possible locations.

Now with more particular reference to the drawings, the embodiment of the invention in FIGS. 1 to 4 inclusive shows a molding machine having a frame 10. The frame 10 is made up of a base, a support for a head 22, the molding head 22, and a loading mechanism. The machine has an upset frame 11 supported above a flask 12. The flask 12 is one of a number of flasks which may be rolled into place over a pattern plate 17 on rollers 19. Sand may be loaded from a loader 18. The loader 18 is of a conventional type having suitable sand valves actuated by cylinders 24 and adapted to drop sand through rotating bladed members 13 which have blades 14 thereon driven by a motor 15.

The blades 14 may be rectangular plate like members having the ends tapered at approximately forty-five degrees as shown and the rectangular members may be disposed perpendicular to the shaft supporting them. The blades 14 may interlock and interfit with each other in the manner shown in FIGS. 17A, 17B, 17C, 18, 19A, 19B, 19C, and 20.

The head may be moved into and out of position on a roller conveyor 29. The molding head in this embodiment may be a diaphragm type molding head of the type shown in Patent 2,715,758 or it could be any other suitable type of head.

When the sand and flasks are in place over the pattern plate 17, a hydraulic cylinder 16 is actuated which lifts a pattern plate 17, thereby lifting the flask 12 off of the rollers 19 into engagement with the upset frame 11 and lifting the upset frame from knife edges 20 to bring the entire device into engagement with the molding head. The upset frame 11 has a bracket 21 thereon which engages the knife edges 20.

The pattern plate 17 has patterns 28 supported thereon and the pattern plate is supported on the hydraulic cylinder 16. The molding head 22 may be retracted to the left by a suitable hydraulic cylinder under the rotating bladed member 13. It will be noted that the axle which supports the blades is about one-fourth the diameter of the blades. This keeps the sand out near the ends of the blades when it may be engaged by the blades.

Blades 113' shown in FIG. 4A are wedge shaped and may be in the shape of an equilateral triangle having the apex attached to a shaft 116' as shown. Blades on adjacent shafts 116' may interfit with each other as shown. Thus, the triangular base of the blades on one shaft will leave a space between the apexes of the triangular blades on the adjacent shaft.

In the embodiment of the blades shown in FIG. 4B, the ends of the blades have rectangular outer portions 213' with intermediate parts 214' which attach the rectangular parts to shafts 216'. The rectangular parts of the blades on one row interfit between the rectangular portions 213' and the shafts on adjacent rows as they rotate.

In the embodiment of the invention shown in FIG. 4C, shafts 316' have plate like rectangular blades 313' spaced around the outer periphery thereof. The blades on each shaft interfit between the blades on adjacent shafts as they rotate. The blades on each adjacent shaft are staggered from those on the shaft adjacent thereto. There may be, for example, four blades at each position on each shaft spaced ninety degrees apart and the blades on the adjacent shaft would be at the forty-five degree position between the shafts adjacent thereto as they rotate. The shafts may be relatively thin and plate like in cross section.

The general purpose of the blade shapes shown in FIGS. 4A, 4B, and 4C is to provide a shaft of relatively large diameter with relatively short teeth thereon. This keeps any sand from entering the space adjacent the center of rotation of the shaft where it would normally be exposed to a low rotational force of the blade. The blades are so designed that all of the sand will be exposed to the relatively large portion of the blade which is travelling at a relatively high peripheral speed. This gives the sand a considerable velocity as well as pulverizing it.

Referring to the embodiment of the invention shown in FIGS. 5 to 8, the machine has a frame 110 which supports an upset 111, flasks 112, and a loading device 118. The flasks 112 are brought in on a roller conveyor 119 and are filled by a sand conditioning device 113 which is similar to that shown in the first embodiment of the invention. The device 113 may be retracted to the position shown in FIG. 8 with a molding head 122 brought into position over the flask. The sand conditioning device 113 may be moved to the position shown in FIG. 6 as the sand passes through the conditioner for conditioning and during loading into the flask. The head 122 may be moved into and out of position on a roller conveyor 129.

In the embodiment of the invention shown in FIGS. 9 and 10, the machine has a frame 210 which supports a roller conveyor 219. The machine has a pattern plate 217 with a pattern 223 thereon. A sand conditioner 213 may have an upset loader 230. The sand conditioner may be retracted and advanced by a cylinder 224. A molding head 222 which may be of the diaphragm type is fixed to a bracket 231 and the head 222 moves into position over a flask 211 when the sand conditioner 213 is moved to the position shown in FIG. 9 and it is moved away from the flask and the conditioner 213 is moved over the flask as shown in FIG. 10. The upset loader 230 is adapted to contain the correct amount of sand to provide one filling of the flask 211. A sliding door 234 is attached to the upset loaded 230 at one side thereof. A hopper 218 is opened and closed by a sliding door 234 when the loader 230 is pushed to the position shown in FIG. 10.

In the embodiment of the invention shown in FIG. 11, an independently operating sand conditioner 313 is supported below a loader 318. A flask 311 may be moved by a suitable conveyor mechanism from the position shown in dotted lines to the position shown in full lines. The machine has a head 322 and a frame 310 as in the other embodiments.

In the embodiment of the invention shown in FIGS. 12 and 13, the machine has a frame 410 and a hopper 418 supported over it with a sand loader 414 having a sand container 415. The container 415 may be shuttled by a cylinder 424 from a position under the hopper 418 to a position over a conditioner 413. When the loader 414 is over the conditioner 413, a door 419 may be retracted by a cylinder 424 so that sand from the loader 414 will fall through the conditioner 413 into a flask 411. Then the flask may be shuttled to the position shown in dotted lines under a head 422 where it may be compressed by a suitable diaphragm supported on the head.

In the embodiment of the invention shown in FIGS. 14 and 15, a safety guard 530 has a rectangular frame which is coextensive with a sand conditioner frame 513. Bladed members 515 are supported in the frame 513 as in the embodiment shown in FIG. 4 and these bladed wheels are driven by a suitable motor 505. The frame 513 has rectangular grids 531 disposed between the sand loader and hopper which will be supported above it and the conditioner frame 513. The grids will break up large lumps of sand before they enter the bladed members 515.

In the embodiment of the invention shown in FIG. 16, a sand conditioner frame 613 has bladed wheels 615. A grid frame 630 is supported above the conditioner frame 613 but, instead of resting on the grid frame 630, it is supported thereon by means of compression springs 636. Thus, the vibration introduced by the springs 636 to the grid frame 630 aids in preventing sand from jamming up on the grid frame 630.

The embodiments of the invention shown in FIGS. 17A, 17B and 17C show schematic views of bladed members for use in a conditioner 713A, 713B, 713C, respectively, such as shown in FIG. 4 having rotating members, each having two, four, and six blades, respectively. Thus, in FIG. 17A, each axle has spaced wheels each having two oppositely disposed blades 714A. FIG. 17B shows blades 714B disposed at ninety degrees to each other on each axle thereof. FIG. 17C shows six blades 714C on each axle thereof. These blades all intermesh with each other, thereby providing the action on the sand set forth previously herein.

FIG. 18 shows a top view of the embodiment shown in FIG. 17C. It shows the conditioner frame 713C with axles 715C having the blades 714C thereon. Every other one of the blades 714C is longer than the ones adjacent it on either side so that the blades interlock with each other laterally as well as axially as shown.

In the embodiment of the invention shown in FIGS. 19A, 19B, 19C, and 20, blades 814A, 814B, and 814C on each of the conditioners 813A, 813B, and 813C, respectively, are staggered so that the blades are of the same length but each blade interfits between the two blades adjacent it on the adjacent axle 815A, 815B, and 815C, respectively. Each blade in adjacent rows is aligned with the corresponding blade on the axle 815A, 815B, and 815C adjacent it.

In the embodiment of the invention shown in FIGS. 21 and 22, a conditioner 913 is shown. Axles 915 have short blades on them and axles 916 have long blades on them. These blades interfit with each other in the manner shown in FIG. 20. This provides a very efficient conditioning action to the sand.

In the embodiment of the invention shown in FIG. 23, a conditioner 1013 is shown wherein blades 1015 are supported on axles 1016. A flywheel 1018A may be mounted on the shaft 1016 as shown. The flywheel may be a disk or wheel type flywheel. The shaft may also have weighted blades 1018B which themselves act as a flywheel. Another flywheel 1018C may be mounted on the shaft of a motor 1021. The location and size of the flywheel is determined by its application, which in turn is governed by the size and purpose for which the sand conditioner is used. The axles 1016 are driven through a gear train train 1028 and a gear box 1029.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a molding machine and a sand container, means to support a flask on said molding machine,
a said conditioner on said molding machine disposed above said flask supporting means,
means supporting said sand container on said machine,
said sand conditioner comprising spaced, horizontally disposed axles having radially extending blades thereon,
means to rotate said axis whereby said blades rotate relative to each other,
means to drop sand to be conditioned through said sand container between said blades,
said blades being driven to impart a direction and velocity to said sand driving it into said flask in fluffed condition,
said means supporting said sand conditioner comprising a moving means for moving said container to and away from a position between said means to drop said sand and said flask.

2. The combination recited in claim 1 wherein
means is provided to move a molding head into positon over said flask,
and means is provided on said machine to move said flask into molding relation with said molding head.

3. The combination recited in claim 2 wherein
a grid frame is disposed between said means to drop sand and said sand conditioner,
said grid frame having spaced bars thereon defining generally rectangular spaces for engaging said sand prior to its engagement with said blades.

4. The combination recited in claim 3 wherein
said blades are disposed on said axles with two said blades at each lateral position ninety degrees apart on said axles,
said blades being disposed in meshing arrangement in parallel rows.

5. The combination recited in claim 3 wherein
said blades are disposed on said axles with two said blades at each lateral position on said axles,
said blades being disposed in meshing staggered arrangement in parallel rows.

6. The combination recited in claim 4 wherein
said blades on alternate said axles are of different size than on the ones adjacent thereto.

7. In combination, a molding machine for green sand and a sand conditioning means,
said machine comprising a frame,
means to support a pattern plate on said frame,
a sand hopper disposed above said pattern plate,
means to support a flask on said machine, a flask on said flask supporting means,
a sand conditioning member comprising an open frame having parallel axles extending across the opening in said frame and having radially extending blades attached to said axles,
and means to move a molding head over said flask and to move said open frame laterally from said flask.

8. The combination recited in claim 7 wherein
said hopper is disposed directly above said flask.

References Cited by the Examiner

UNITED STATES PATENTS

| 664,260 | 12/1900 | Gaunt | 141—129 X |
| 706,487 | 8/1902 | Battenfeld | 22—35 |
| 1,570,652 | 1/1926 | Townsend | 22—36 |
| 2,676,694 | 4/1954 | Wyss et al. | 222—271 X |
| 2,767,445 | 10/1956 | Taccone | 22—35 X |
| 3,081,505 | 3/1963 | Butzow | 22—35 |
| 3,123,873 | 3/1964 | Taccone | 22—42 |

FOREIGN PATENTS 623,388  7/1961  Canada.

MARCUS U. LYONS, *Primary Examiner.*